(12) United States Patent
Yanagisawa et al.

(10) Patent No.: US 6,522,619 B2
(45) Date of Patent: Feb. 18, 2003

(54) OPTICAL PICK-UP DEVICE HAVING A PLURALITY OF LIGHT SOURCES WITH DIFFERENT CALORIFIC VALUES AND METHOD OF MANUFACTURING THE SAME

(75) Inventors: Katsushige Yanagisawa, Nagano (JP); Tohru Hotta, Nagano (JP); Ikuo Kasuga, Nagano (JP); Toshihiko Okina, Nagano (JP); Satoru Kishita, Tokyo (JP); Hidenori Sai, Tokyo (JP)

(73) Assignees: Kabushiki Kaisha Sankyo Seiki Seisakusho, Nagano (JP); Toshiba Corporation, Kanagawa (JP)

( * ) Notice: Subject to any disclaimer, the term of this patent is extended or adjusted under 35 U.S.C. 154(b) by 151 days.

(21) Appl. No.: 09/728,059

(22) Filed: Dec. 4, 2000

(65) Prior Publication Data

US 2001/0043520 A1 Nov. 22, 2001

(30) Foreign Application Priority Data

Dec. 2, 1999 (JP) .......................... 11-342956

(51) Int. Cl.$^7$ ................................ G11B 7/00
(52) U.S. Cl. .................... 369/121; 369/112.05
(58) Field of Search ................. 369/121, 120, 369/112.01, 112.28, 112.05

(56) References Cited

U.S. PATENT DOCUMENTS

| | | | | |
|---|---|---|---|---|
| 6,072,579 A | * | 6/2000 | Funato | 369/112.12 |
| 6,125,091 A | * | 9/2000 | Kasuga | 369/112.05 |
| 6,163,409 A | * | 12/2000 | Uchiyama et al. | 359/634 |

* cited by examiner

Primary Examiner—Paul W. Huber
(74) Attorney, Agent, or Firm—Sughrue Mion, PLLC

(57) ABSTRACT

An optical pick-up device (1) includes a laser diode (2) for recording which acts as a fixation side light source attached to an attachment portion (5) of a device frame (4) and has a great calorific value, and a laser diode (3) for reproduction which acts as an adjustment side light source held in a holder (6) fixed with an adhesive (7) in a clearance (46) provided on a side surface (45) of the device frame. Heat generated from the laser diode (2) for recording is radiated efficiently through the device frame (4), and heat generated from the laser diode (3) is also radiated efficiently through the holder (6) fixed with the adhesive (7) which is partially filled for the device frame (4) with the clearance (46) formed.

8 Claims, 3 Drawing Sheets

OPTICAL PICK-UP DEVICE HAVING A PLURALITY OF LIGHT SOURCES WITH DIFFERENT CALORIFIC VALUES AND METHOD OF MANUFACTURING THE SAME

BACKGROUND OF INVENTION

1. Field of Invention

The present invention relates to an optical pick-up device comprising a plurality of light sources and a common optical system for guiding lights emitted from the light sources to an optical recording medium in order to reproduce different optical recording media such as a CD or a DVD or carry out recording and reproduction.

2. Related Art

There has been known an optical pick-up device of a plural light source type which is incorporated in an interchangeable optical type information reproducing device capable of reproducing a DVD, CD, CD-R, CD-R/RW (which will be hereinafter referred to as CDs). For example, one of the present applicants has proposed an optical pick-up device comprising two laser diodes for emitting laser beams having different wavelengths to reproduce a DVD and a CD which have different thicknesses.

Such an optical pick-up device of a 2-light source type comprises a laser diode for emitting a laser beam for a CD having a wavelength of 780 nm and a laser diode for emitting a laser beam for a DVD having a wavelength of 650 nm, for example, and is constituted to receive a return light from an optical recording medium to one common light receiving element, thereby generating a reproducing signal and a servo signal for correcting a tracking error and a focusing error.

The two laser diodes and the light receiving element are positioned in the following manner to have an optical conjugating relationship with each other. First of all, one of the laser diodes is fixed to an attachment portion which is formed on a device frame (head base) in advance. Next, a position of the light receiving element is adjusted in a direction of an optical axis and a direction of a plane orthogonal to the optical axis such that the light receiving element is set in a conjugating position with the laser diode, and the light receiving element is attached to the device frame after the adjustment. Then, positions of the other laser diode in x, y and z directions are adjusted such that the laser diode is set in a conjugating position with the laser diode and the light receiving element which have already been fixed, and the laser diode is thus bonded and fixed to the device frame. In general, the other laser diode is holding a hold. And the holder and the device frame is bonded and fixed in y direction of the device frame contacting the holder.

In the optical pick-up device of a 2-light source type for reproduction, generally, an optical system for DVD reproduction requires higher positioning precision than an optical system for CD reproduction. Therefore, the laser diode for DVD reproduction is set to be a fixation side laser diode to be fixed to the attachment portion formed on the device frame, and the laser diode for CD reproduction is set to be an adjustment side laser diode to be bonded and fixed to the device frame after the positional adjustment in x, y and z directions.

The adjustment side laser diode is held in a holder having a smaller heat capacity than that of the device frame, and the holder is chucked by means of a positioning jig to adjust the position of the adjustment side laser diode, and is bonded and fixed to the device frame after the adjustment.

Thus, the adjustment side laser diode is held in the holder having a smaller heat capacity, and furthermore, the holder is fixed to the device frame side with an adhesive having poor heat radiation. Accordingly, the adjustment side laser diode has poorer heat radiation than that of the fixation side laser diode fixed to the attachment portion formed on the device frame.

In the optical pick-up device dedicated to reproduction, the adjustment side laser diode has a small calorific value. Therefore, the heat radiation of the adjustment side laser diode has no particular problem. However, in an optical pick-up device for recording, a laser diode to be used has higher output power than that of the optical pick-up device dedicated to reproduction. Consequently, a calorific value is also increased. Thus, there is a possibility that the laser diode might be overheated to an allowable temperature or more through self heat generation in a real use state.

Furthermore, the other laser diode is holding a hold. And the holder and the device frame are bonded and fixed in the y direction of the device frame contacting the holder. So, a strain is caused in the x direction.

However, in the optical pick-up device comprising a plurality of light sources, the heat generation of each light source and bad effects caused thereby have not conventionally been considered. Under the actual circumstances, accordingly, the countermeasures have not been proposed.

SUMMARY OF INVENTION

Therefore, it is an object of the invention to provide an optical pick-up device comprising a plurality of light sources, each of which is never brought into an overheating state, and a method of manufacturing the optical pick-up device.

In order to solve the above-mentioned problems, the invention provides an optical pick-up device comprising first and second light sources, an attachment portion having the first light source attached thereto being formed on a device frame or the first light source being attached to a light source holder and the light source holder being provided in close contact with the device frame, the device having a light source holder holding the second light source and fixed to the device frame, and a common optical system for guiding lights emitted from the first and second light sources to an optical recording medium, wherein a calorific value of the first light source in a real use state is greater than that of the second light source in the real use state.

In the invention, the first light source having a great calorific value is attached to the device frame side having a great heat capacity and high heat radiation, and the second light source having a small calorific value is attached to the light source holder side. Therefore, it is possible to prevent each light source from being brought into an overheating state.

In order to improve the precision and reliability of the fixing position of the light source holder holding the second light source, it is desirable that a clearance should be formed between the light source holder holding the second light source and the device frame and the light source holder should be bonded and fixed to the device frame with an adhesive partially filled in the clearance.

Furthermore, it is desirable that the adhesive should bond and fix the light source holder to the device frame such that a main volume thereof is included in a space in which they are opposed to each other.

In general, a light source for recording having great output power is used for the first light source and a light source for reproduction having small output power is used for the second light source.

As an example, the first light source is a laser beam source for CD-R/RW recording and the second light source is a laser beam source for DVD reproduction.

The invention provides an optical pick-up device comprising first and second light sources, an attachment portion having the first light source attached thereto being formed on a device frame or the first light source being attached to a light source holder and the light source holder being provided in close contact with the device frame, the device having a light source holder holding the second light source and fixed to the device frame, and a common optical system for guiding lights emitted from the first and second light sources to an optical recording medium, wherein a calorific value of the first light source in a real use state is greater than that of the second light source in the real use state, and a method of manufacturing the optical pick-up device in which a clearance is formed between the light source holder holding the second light source and the device frame and the light source holder is bonded and fixed to the device frame with an adhesive partially filled in the clearance.

In the method according to the invention, first of all, the light source holder holding the second light source is positioned such that the second light source has a conjugating positional relationship with the first light source with respect to the common optical system in a state in which the first light source is attached to the light source attachment portion. Next, the adhesive is partially filled between the light source holder and the device frame to bond and fix the light source holder to the device frame.

In the method according to the invention, the positioning is carried out in a state in which the light source holder is provided apart from the device frame, that is, it floats. Therefore, the positioning can be carried out more easily with higher precision as compared with the case in which the positioning is performed along the side surface of the device frame.

DETAILED DESCRIPTION OF PREFERRED EMBODIMENTS

An optical pick-up device according to an embodiment of the invention will be described below with reference to the drawings.

Figure 1:
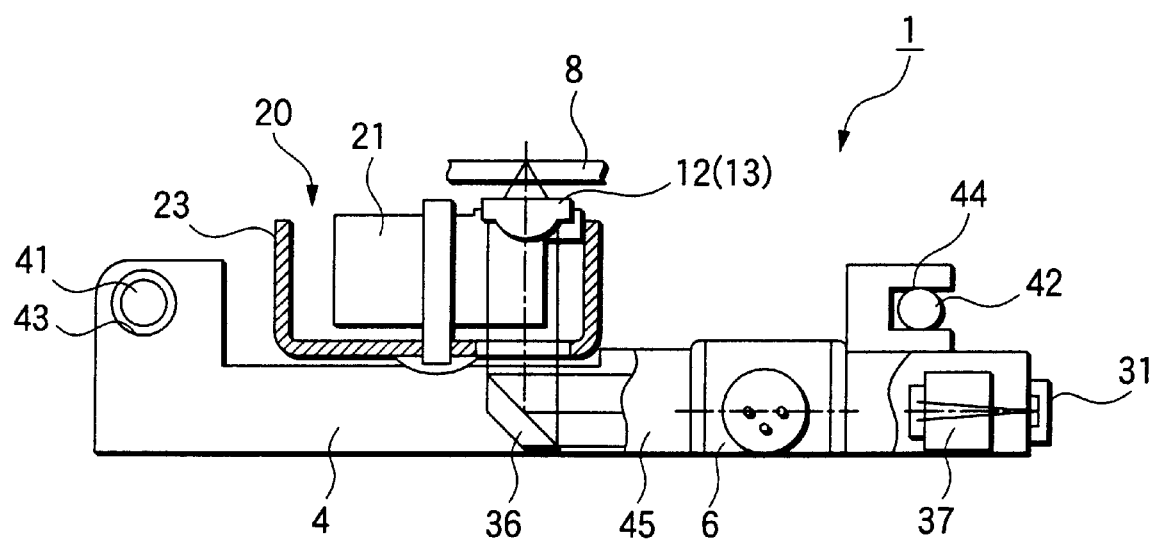
FIG. 1 is a sectional view showing a structure of an optical pick-up device according to the invention.
Figure 2:
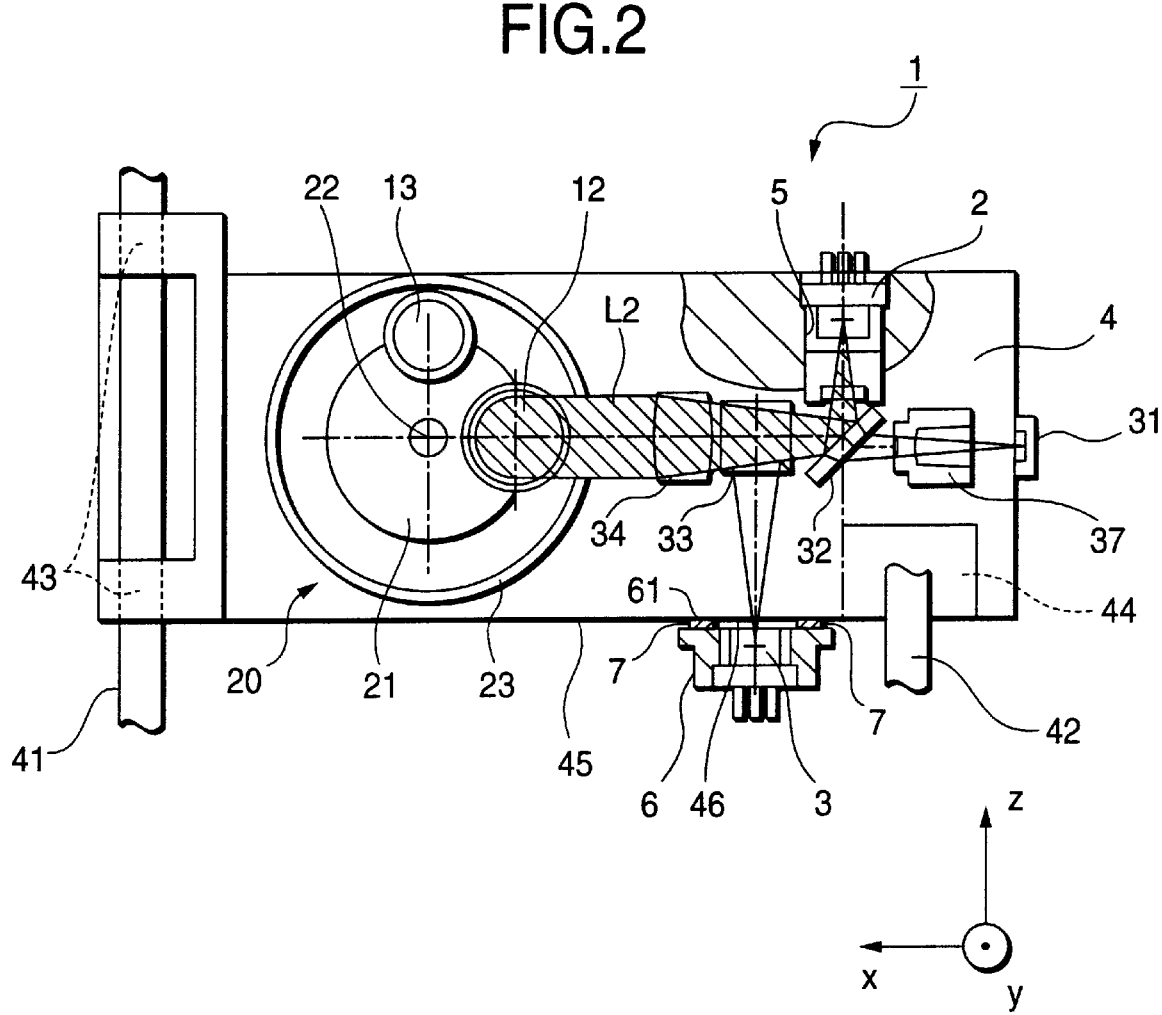
FIG. 2 is a plan view showing a state in which a laser diode for a CD is used in the optical pick-up device of FIG. 1.
Figure 3:
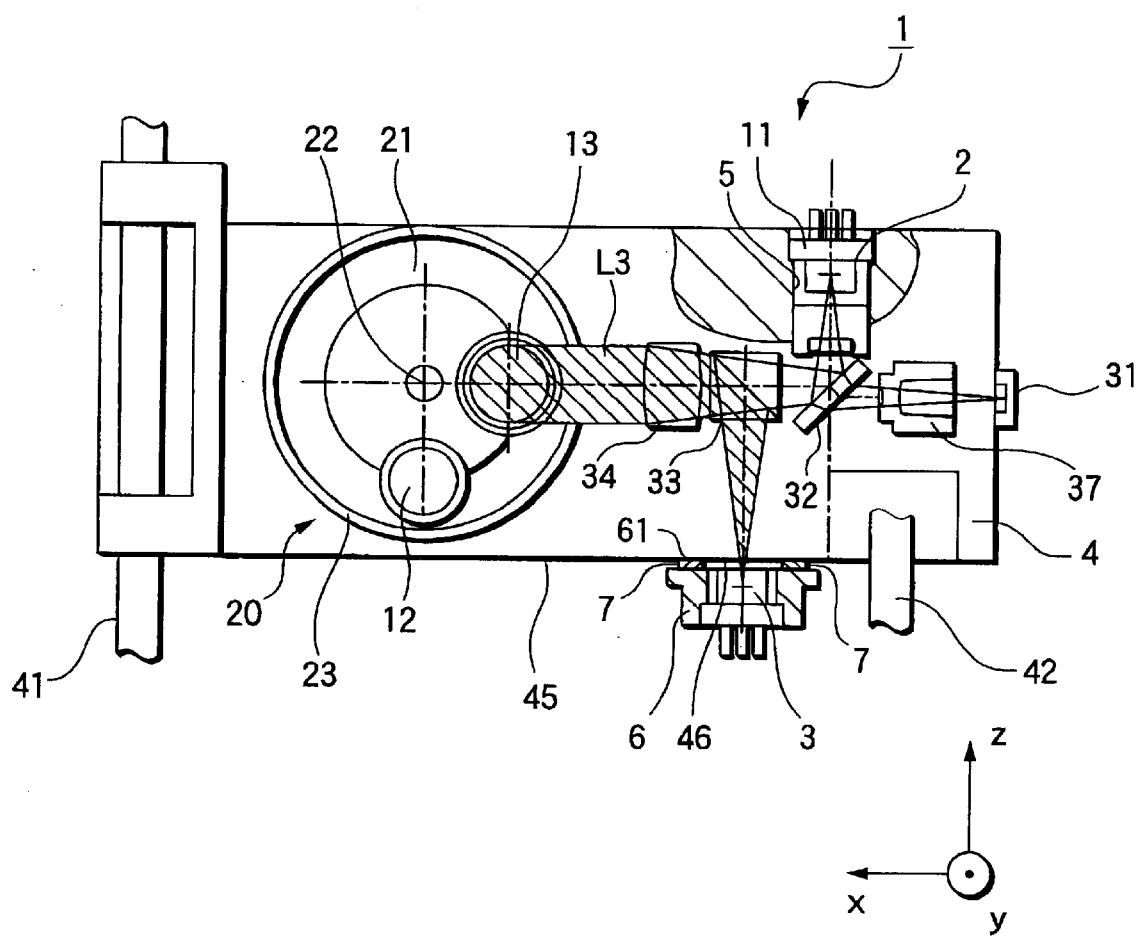
FIG. 3 is a plan view showing a state in which a laser diode for a DVD is used in the optical pick-up device of FIG. 1.

FIG. 1 is a side view showing a structure of the optical pick-up device according to the embodiment, and FIGS. 2 and 3 are plan views showing the same. Description will be given with reference to these drawings. An optical pick-up device 1 according to the embodiment is an optical pick-up device for recording and reproduction of a 2-light source type which comprises a laser diode 2 for CD-R /RW recording and a laser diode 3 for DVD reproduction, and an attachment portion 5 of the laser diode 2 is formed on one of side surface sides of a rectangular device frame (head base) 4. A cylindrical holder 6 is bonded and fixed to the other side surface of the device frame 4 with an adhesive 7, and the laser diode 3 is attached to the holder 6.

An objective lens 12 for a CD and an objective lens 13 for a DVD are provided as objective lenses for causing laser beams L2 and L3 emitted from the laser diodes 2 and 3 to converge as light spots on the recording plane of an optical recording medium 8, and are switched for use. In the embodiment, these objective lenses 12 and 13 are mounted on a lens holder 21 of an objective lens driving mechanism 20 which is referred to as a shaft sliding and rotating type.

The objective lens driving mechanism 20 has the lens holder 21, a sliding shaft 22 movably supporting the lens holder 21 in focusing and tracking directions, and a magnetic driving circuit (not shown) for moving the lens holder 21 in the focusing and tracking directions. The magnetic driving circuit is constituted between the lens holder 21 and a cup-shaped yoke 23 surrounding the lens holder 21. Since the objective lens driving mechanism 20 of this type is well known, detailed description will be omitted in this specification. As a matter of course, an objective lens driving mechanism of another type can also be used.

In the embodiment, the two objective lenses 12 and 13 are mounted on the upper surface of the lens holder 21 at an interval of 90 degrees. During CD-R/RW recording, the objective lens 12 for a CD is switched into a use position thereof as shown in FIG. 2. During DVD reproduction, the lens holder 21 is rotated by 90 degrees in the state of FIG. 2, thereby switching the objective lens 13 for a DVD into a use position thereof as shown in FIG. 3.

Moreover, a common optical system for guiding the laser beams emitted from the laser diodes 2 and 3 to the objective lenses 12 and 13 in the use positions and guiding a return light reflected by the optical recording medium 8 to a photodetector 31 attached to the end face of the device frame 4 is constituted as follows. More specifically, the common optical system has a half mirror 32 for reflecting a part of the laser beam L2 emitted from the laser diode 2 toward the objective lens side, a prism 33 provided with a reflecting surface for reflecting the laser beam L3 emitted from the laser diode 3 toward the objective lens side, a collimate lens 34 for changing the laser beam guided from the laser diode 2 through the half mirror 32 and the prism 33 and the laser beam guided from the laser diode 3 through the prism 33 into parallel beams, a rising mirror 36 for causing the parallel beam to rise toward the objective lens 12 or 13 in the use position, and a sensor lens 37 for giving an aberration for error signal detection to a return light obtained through the collimate lens 34, the prism 33 and the half mirror 32 by reflection of the optical recording medium 8.

In general, the device frame 4 is aluminum die casting and is provided with a guide hole 43 and a guide trench 44 for sliding the optical pick-up device 1 along a pair of guide shafts 41 and 42 arranged on the recording and reproducing device side where the optical pick-up device 1 is to be mounted.

The holder 6 holding the laser diode 3 for a DVD includes an annular end face 61 opposed to a side surface 45 of the device frame with a constant clearance 46 formed therebetween, and an adhesive 7 is partially filled between the side surface 45 of the device frame and the annular end face 61 so that the holder 6 is bonded and fixed to the side surface 45 of the device frame. Accordingly, the clearance 46 remains in portions other than the adhesive filling portion.

The holder 6 is bonded to the device frame 4 through at least adjustment in a Z direction (a direction of an optical axis of the laser diode 3). The clearance 46 has a minimum value within a range in which the holder 6 can be adjusted in the Z direction. More specifically, the amount of adjustment required for the position of the holder 6 in a Z-axis direction is approximately ±0.3 mm. Therefore, the clearance 46 is set to 0.3 mm±0.3 mm.

Furthermore, the adhesive 7 filled in the clearance 46 is coated such that an almost gross volume thereof is included in a space in which the holder 6 is opposed to the device frame 4. Consequently, a thickness of the adhesive 7 in the Z direction has a small value of approximately 0.3 mm, and it is possible to set a state in which a variation is rarely generated depending on a place of coating.

In general, the volume of the adhesive is changed more greatly depending on curing and contraction, a temperature, and moisture absorption than that of a metallic material or an engineering plastic material, and a variation in the thickness of the adhesive causes a shift of the position of an object to be bonded. In the bonding structure according to the invention, however, it is possible to reduce the positional shift. Accordingly, such bonding can implement high positioning precision required in the laser diode 3 for a DVD.

Description will be given to the procedure for attaching the laser diodes 2 and 3 in the optical pick-up device 1 having such a structure. First of all, each optical element constituting the common optical system is attached to the device frame 4 and the laser diode 2 for a CD is attached, bonded and fixed to the device frame attachment portion 5. Next, the position of the photodetector 31 is adjusted three-dimensionally (x, y and z directions) such that the photodetector 31 has a conjugating positional relationship with the laser diode 2. Thus, the photodetector 31 is bonded and fixed to the end face of the device frame.

Then, the laser diode 3 is positioned in the x, y and z directions such that it has a conjugating positional relationship with the laser diode 2 and the photodetector 31 which have already been fixed. Thus, the laser diode 3 is bonded and fixed to the side surface 45 of the device frame. More specifically, the holder 6 holding the laser diode 3 is chucked with a positioning jig (not shown). In this state, the annular end face 61 of the holder 6 is caused to float from the side surface 45 of the device frame. Thus, the positioning is carried out in the three directions. After the positioning, the clearance 46 between the annular end face 61 and the side surface 45 of the device frame is partially filled with the adhesive 7. Thus, the holder 6 is bonded and fixed to the side surface 45 of the device frame.

In the optical pick-up device having such a structure according to the embodiment, the laser diode 2 for a CD having high output power to carry out recording is used as the fixation side laser diode to be directly attached to the device frame, and the laser diode 3 for a DVD which is dedicated to reproduction and has small output power is used as the adjustment side laser diode. The device frame 4 has a great heat capacity. Therefore, the laser diode for a CD having the high output power and great calorific value can be prevented from being brought into an overheating state during real use.

Moreover, the laser diode 3 for a DVD is held in the holder 6. The holder 6 is bonded and fixed to the side surface 46 of the device frame in the state in which the clearance 46 is provided, that is, the floating state. Therefore, the laser diode 3 can be positioned more easily with higher precision than the case in which it is surface mounted on the device frame. In the embodiment, particularly, the clearance 46 is formed in the direction of the optical axis of the emitted laser beam L3. Consequently, the positioning in the direction of the optical axis (the z direction) can be carried out readily.

Furthermore, since the laser diode 3 for a DVD is dedicated to the reproduction, it can be prevented from being brought into the overheating state due to self heat generation in the real use state.

Another Embodiment

While the optical pick-up of a 2-light source type is used in the embodiment, the invention can also be applied to an optical pick-up device of a plural light source type comprising three or more light sources.

Although the photodetector is common to each light source in the embodiment, the invention can also be applied to an optical pick-up device having such a structure that the photodetector is provided for each light source.

Furthermore, while the two objective lenses are provided corresponding to the optical recording medium and are switched for use in the embodiment, the invention can also be applied to an optical pick-up device using a single objective lens.

As described above, in the optical pick-up device according to the invention, the light source having a great calorific value, which is used as a light source for recording, acts as the fixation side light source attached to the device frame side having a great heat capacity, and the light source having a small calorific value, which is used as a light source for reproduction, acts as the adjustment side light source to be surface mounted on the device frame. Accordingly, it is possible to reliably prevent the light source from being brought into the overheating state.

In the invention, moreover, the holder holding the adjustment side light source is positioned apart from the side surface of the device frame and the clearance is partially filled with the adhesive to fix the holder to the device frame side. Therefore, the adjustment side light source held in the holder can be positioned easily with high precision.

Furthermore, the clearance between the holder and the device frame is filled with the adhesive. Therefore, the thickness of the adhesive is made uniform and the positional shift of the holder can be reduced even if the volume of the adhesive is changed due to a change in a temperature, a change in moisture absorption, and curing and contraction. Thus, the holder can be positioned with high precision and high reliability can be realized.

What is claimed is:

1. An optical pick-up device, comprising:
   a device frame having an attachment portion,
   a first light source fixed to the attachment portion, having a first Calorific value in an operation condition,
   a second light source having a second Calorific value lower than the first Calorific value in the operation condition,
   guiding means for guiding the light from the first and the second light sources to an optical recording medium,
   a detector detecting a return light obtained through the guiding means by reflection of the optical recording medium, the detector adjusted to a first optimum position on the device frame for the first light source and fixed to the optimum position, and
   a source holder holding the second light source, the source holder adjusted to a second optimum position on the device frame for the first light source and the detector, and fixed to the second optimum position,
   wherein the holder have an end face, the end face is positioned to the second optimum position at a predetermined distance from the device frame, and a fixing means is filled in the predetermined distance between the end face and the device frame.

2. The optical pick-up device according to claim 1, wherein the member provided in a clearance is an adhesive and the source holder and the device frame are bonded and fixed with the adhesive.

3. The optical pick-up device according to claim 2, wherein a main volume of the adhesive is included in a space in which the source holder is opposed to the device frame.

4. The optical pick-up device according to claim 1, wherein the first light source is a light source for recording and the second light source is a light source for reproduction.

5. The optical pick-up device according to claim 4, wherein the first light source is a laser light source for CD-R/RW recording and the second light source is a laser light source for DVD reproduction.

6. A method of manufacturing an optical pick-up device, the optical pick-up device including a device frame having an attachment portion, a first light source having a first Calorific value in an operating condition, a second light source having a second Calorific value in the operating condition, guiding means for guiding the light from the first and second light sources to an optical recording medium, a detector detecting a return light obtained through the guiding means by reflection of the optical recording medium, and a source holder holding the second light source, comprising:

fixing the first light source to the attachment portion;

adjusting the detector to a first optimum position on the device frame for the first light source;

fixing the detector to the optimum position;

adjusting the second light source held to the source holder to a second optimum position on the device frame for the first light source and the detector, while an end face of the holder is positioned at the second optimum position with a predetermined distance from the device frame, the second Calorific value of the second light source being lower than the first Calorific value of the first light source in the operating condition; and filling the predetermined distance between the end face and the device frame with fixing means to fix the source holder on the device frame.

7. A method of manufacturing the optical pick-up device, said optical pick-up device comprising:

a device frame having an attachment portion;

a first light source fixed to the attachment portion, having a first Calorific value in an operation condition;

a second light source having a second Calorific value lower than the first heat capacity in the operation condition;

guiding means for guiding the light from the first source and the second light source to an optical recording medium;

detector means for detecting a return light obtained through the guiding means by reflection of the optical recording medium, the detector means adjusted to a first optimum position on the device frame for the first light source and fixed to the first optimum position;

a source holder holding the second light source, the source holder having an end face positioned at a second optimum position with a predetermined distance form the device frame; and fixing means for filling the predetermined distance to fix the source holder on the device frame.

8. By A method of manufacturing the optical pick-up device, wherein said optical pick-up device includes a device frame having an attachment portion, a first light source fixed to the attachment portion; a source holder attached to the device frame; a second light source attached to the source holder; a Calorific value of the second light source lower than a Calorific value of the first light source in a real use state; and a common optical system included in the device frame, guiding the light from the first and the second light source to an optical recording medium, comprising:

fixing the first light source in the attachment portion;

positioning the light source holder holding the second light source such that the second light source has a conjugating positional relationship with the first light source with respect to the common optical system; and, filling the adhesive between the light source holder and the device frame to bond and fix the light source holder to the device frame.

* * * * *